US010732298B2

(12) United States Patent
Nishita et al.

(10) Patent No.: US 10,732,298 B2
(45) Date of Patent: Aug. 4, 2020

(54) OPERATING DEVICE, OPERATING METHOD, OPERATING SYSTEM, AND OPERATING PROGRAM

(71) Applicant: Topcon Corporation, Itabashi-ku, Tokyo (JP)

(72) Inventors: Nobuyuki Nishita, Tokyo (JP); Yasuo Terashima, Tokyo (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 314 days.

(21) Appl. No.: 15/838,754

(22) Filed: Dec. 12, 2017

(65) Prior Publication Data

US 2018/0172843 A1    Jun. 21, 2018

(30) Foreign Application Priority Data

Dec. 21, 2016    (JP) .................. 2016-247917

(51) Int. Cl.
| | | |
|---|---|---|
| *G01S 19/51* | (2010.01) | |
| *B64C 39/02* | (2006.01) | |
| *G01C 21/20* | (2006.01) | |
| *G01S 19/07* | (2010.01) | |
| *G01S 19/11* | (2010.01) | |
| *G01C 15/00* | (2006.01) | |
| *G01S 19/48* | (2010.01) | |
| *G01S 19/15* | (2010.01) | |

(Continued)

(52) U.S. Cl.
CPC ............ *G01S 19/51* (2013.01); *B64C 39/024* (2013.01); *G01C 15/00* (2013.01); *G01C 15/002* (2013.01); *G01C 21/20* (2013.01); *G01S 17/42* (2013.01); *G01S 17/66* (2013.01); *G01S 19/07* (2013.01); *G01S 19/11* (2013.01); *G01S 19/15* (2013.01); *G01S 19/48* (2013.01)

(58) Field of Classification Search
CPC .......... G01S 19/14; G01S 19/51; G01S 19/48; G01S 19/15; G01S 19/11; G01S 19/07; G01S 17/66; G01S 17/42; G01S 5/0072; G01S 5/0027; G01C 21/20; G01C 15/002; G01C 15/00; B64C 39/024
USPC ..................................................... 342/357.34
See application file for complete search history.

(56) References Cited

U.S. PATENT DOCUMENTS

| 2014/0210663 A1 | 7/2014 | Metzler | |
|---|---|---|---|
| 2016/0253808 A1* | 9/2016 | Metzler ............... | G05D 1/0094 382/103 |
| 2016/0292872 A1* | 10/2016 | Hammond ............ | G01S 17/66 |

(Continued)

*Primary Examiner* — Harry K Liu
(74) *Attorney, Agent, or Firm* — Chiesa Shahinian & Giantomasi PC (57) ABSTRACT

A technique for more reliably capturing a lost unmanned aerial vehicle in tracking the unmanned aerial vehicle by a surveying device is provided. A UAV search controlling part configured to be used in a search for an unmanned aerial vehicle that flies along a predetermined flight path includes an estimating part and a search controlling part. The estimating part estimates, on the basis of location data of a surveying device that surveys a location of the unmanned aerial vehicle by using laser light and on the basis of the predetermined flight path, a direction of the unmanned aerial vehicle as seen from the surveying device at a specific time. The search controlling part controls to allow the surveying device to search for the unmanned aerial vehicle, on the basis of the estimated direction.

6 Claims, 5 Drawing Sheets

(51) Int. Cl.
 *G01S 17/66* (2006.01)
 *G01S 17/42* (2006.01)

(56) References Cited

U.S. PATENT DOCUMENTS

2016/0349746 A1* 12/2016 Grau .................... G05D 1/0094
2018/0218618 A1*  8/2018 Rysdyk ................ B64C 39/024

\* cited by examiner

OPERATING DEVICE, OPERATING METHOD, OPERATING SYSTEM, AND OPERATING PROGRAM

CROSS-REFERENCE TO RELATED APPLICATION

This application is based upon and claims the benefit of priority from Japanese Patent Application No. 2016-247917, filed Dec. 21, 2016, the entire contents of which are incorporated herein by reference.

TECHNICAL FIELD

The present invention relates to a technique for locating an unmanned aerial vehicle.

BACKGROUND

Technologies using an unmanned aerial vehicle (UAV) in surveying are publicly known. The UAV used in these technologies may be mounted with a location measuring device using a global navigation satellite system (GNSS) (what is called a "GPS receiver"), an inertial measurement unit (IMU), an altimeter, and a camera. Such a UAV may be made to photograph the ground while flying along a predetermined path in aerial photogrammetry or in other surveying.

Photogrammetry greatly depends on accuracy of location data of the camera. The UAV can locate its own location using the GNSS, but the locating accuracy is approximately 1 meter in a horizontal direction and is approximately 3 meters in a vertical direction, which does not satisfy the accuracy required in the photogrammetry. Mounting of a more highly accurate location measuring device using a GNSS on the UAV may be considered, but this idea is difficult to apply to a general purpose UAV in consideration of weight and electric power consumption of the device. To solve these problems, a total station (TS) may be used to track a UAV in flight and locate the UAV by using its laser distance measuring function (for example, refer to US2014/0210663).

This method of tracking the UAV by the TS uses an automatic target-tracking function of the TS. In this technique, scanning laser light is used to capture and track the UAV. The UAV has a reflective prism that reflects the scanning laser light back in the incident direction, and the TS detects light reflected from the reflective prism to track the UAV.

The UAV can move unpredictably due to winds and other factors, and the TS may lose sight of the UAV. The TS may also lose sight of the UAV while tracking the UAV due to obstacles, such as tree branches, leaves, birds, utility poles, and electric lines, between the TS and the UAV.

SUMMARY

Although the TS has a function of searching for a target, there are many errors in recapturing a lost UAV when targeting a UAV that moves in the air (although there are of course also cases of successful recapturing of UAVs). In view of these circumstances, an object of the present invention is to provide a technique for more reliably capturing a lost unmanned aerial vehicle in tracking the unmanned aerial vehicle by a surveying device.

A first aspect of the present invention provides an operating device configured to be used in a search for an unmanned aerial vehicle that flies along a predetermined flight path. The operating device includes an estimating part and a search controlling part. The estimating part estimates, on the basis of location data of a surveying device that surveys a location of the unmanned aerial vehicle by using laser light and on the basis of the predetermined flight path, a direction of the unmanned aerial vehicle as seen from the surveying device at a specific time. The search controlling part controls to allow the surveying device to search for the unmanned aerial vehicle, on the basis of the estimated direction.

According to a second aspect of the present invention, in the first aspect of the present invention, the operating device may also include an apparent speed estimating part that estimates an apparent speed of the unmanned aerial vehicle as seen from the surveying device on the basis of the predetermined flight path. The search controlling part may control to allow a movable part of the surveying device to move at an apparent speed greater than the estimated apparent speed of the unmanned aerial vehicle in search for the unmanned aerial vehicle performed by the surveying device.

According to a third aspect of the present invention, in the first or the second aspect of the present invention, the surveying device may search for the unmanned aerial vehicle at at least one of the following timings: when the estimated apparent speed is not greater than a predetermined value; when the unmanned aerial vehicle makes a circular flight, which is estimated by the estimating part; when the unmanned aerial vehicle flies in a direction away from the surveying device, which is estimated by the estimating part; and when the unmanned aerial vehicle flies beyond a predetermined distance from the surveying device, which is estimated by the estimating part.

According to a fourth aspect of the present invention, in any one of the first to the third aspects of the present invention, the search for the unmanned aerial vehicle may be performed when the surveying device loses sight of the unmanned aerial vehicle. According to a fifth aspect of the present invention, in any one of the first to the fourth aspects of the present invention, the estimating part may estimate at least one of an airspace where the unmanned aerial vehicle makes a circular flight, an airspace where the unmanned aerial vehicle flies in a direction away from the surveying device, and an airspace where the unmanned aerial vehicle flies beyond the predetermined distance from the surveying device, and the search controlling part may select at least one of the estimated airspaces and control the search for the unmanned aerial vehicle in the selected airspace.

A sixth aspect of the present invention provides an operating method used in a search for an unmanned aerial vehicle that flies along a predetermined flight path. The operating method includes estimating, on the basis of location data of a surveying device that surveys the unmanned aerial vehicle by using laser light and on the basis of the predetermined flight path, a direction of the unmanned aerial vehicle as seen from the surveying device at a specific time, and controlling to allow the surveying device to search for the unmanned aerial vehicle, on the basis of the estimated direction.

A seventh aspect of the present invention provides an operating system configured to be used in a search for an unmanned aerial vehicle that flies along a predetermined flight path. The operating system includes an estimating part and a search controlling part. The estimating part estimates, on the basis of location data of a surveying device that surveys the unmanned aerial vehicle by using laser light and on the basis of the predetermined flight path, a direction of the unmanned aerial vehicle as seen from the surveying device at a specific time. The search controlling part controls to allow the surveying device to search for the unmanned aerial vehicle, on the basis of the estimated direction.

An eighth aspect of the present invention provides a non-transitory computer recording medium storing computer executable instructions that, when executed by a computer processor in a search for an unmanned aerial vehicle that flies along a predetermined flight path, cause the computer processor to: estimate, on the basis of location data of a surveying device that surveys the unmanned aerial vehicle by using laser light and on the basis of the predetermined flight path, a direction of the unmanned aerial vehicle as seen from the surveying device at a specific time, and control to allow the surveying device to search for the unmanned aerial vehicle, on the basis of the estimated direction.

The present invention enables more reliable locating of a lost unmanned aerial vehicle in a technique of tracking the unmanned aerial vehicle by a surveying device.

BRIEF SUMMARY OF THE EMBODIMENTS

Figure 1:
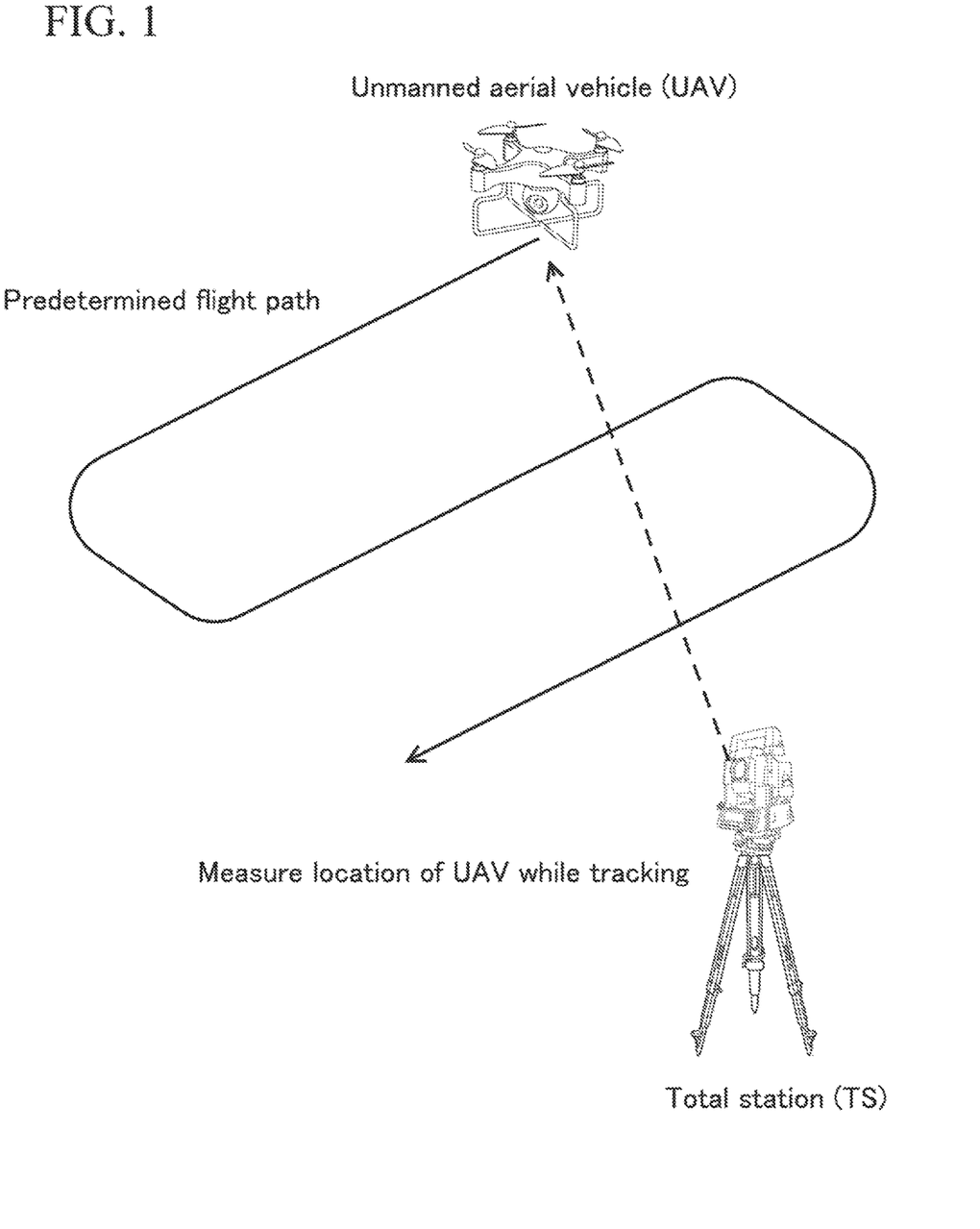
FIG. 1 is a principle diagram relating to measurement of location of a UAV.

FIG. 1 shows an unmanned aerial vehicle (UAV) in flight and a total station (TS) arranged on the ground in accordance with an embodiment. A commercially available UAV can be used, and the UAV can autonomously fly along a predetermined flight path and conduct photographing for aerial photogrammetry. Also, the flight of the UAV can be wirelessly controlled. The UAV is mounted with a camera, a location measuring device using a global navigation satellite system (GNSS) (for example, a GPS receiver), an inertial measurement unit (IMU), an altimeter, a storage for storing a predetermined flight path and flight log, and a control unit for flight.

The UAV flies along a predetermined flight path at a predetermined speed by using its location measuring device and its IMU. The location measuring device can generate measurement errors, and therefore, there is some degree of margin of error between the predetermined flight path and the flight path actually passed. The progress of the flight is stored in a flight log file. The flight log file contains information of time and location (latitude, longitude, and altitude) in association with each other.

The UAV is attached with a dedicated reflective prism at a position that is easy to view from the outside (a position easy for the TS to find, for example, a bottom of the UAV). The reflective prism receives and reflects both scanning laser light from the TS and distance measuring laser light. The reflective prism is a dedicated target for survey by the TS and reflects incident laser light back in the incident direction.

The TS has a highly accurate location measuring device using a GNSS, a camera for obtaining images, a laser scanning function for searching for a target (the reflective prism), a laser distance measuring function for measuring a distance to the target by using distance measuring laser light, and a measuring function for measuring the direction (a horizontal angle and a vertical angle, which is an elevation angle or a depression angle) of the target of which the distance is measured by using the laser light. Measuring the distance and the direction of the target provides the location of the target relative to the TS. Under the condition that the location of the TS is known, the location of the target (here, the UAV) in a map coordinate system (latitude, longitude, and altitude) or in an orthogonal coordinate system (XYZ coordinates) is determined. These functions are normally provided to a commercially available TS and are not special. These techniques relating to the TS may be found in Japanese Unexamined Patent Applications Laid-Open Nos. 2009-229192 and 2012-202821, for example. The map coordinate system is a coordinate system for describing map information (for example, latitude, longitude, and altitude or elevation). For example, location information obtained from the GNSS is normally described in the map coordinate system.

Figure 2:
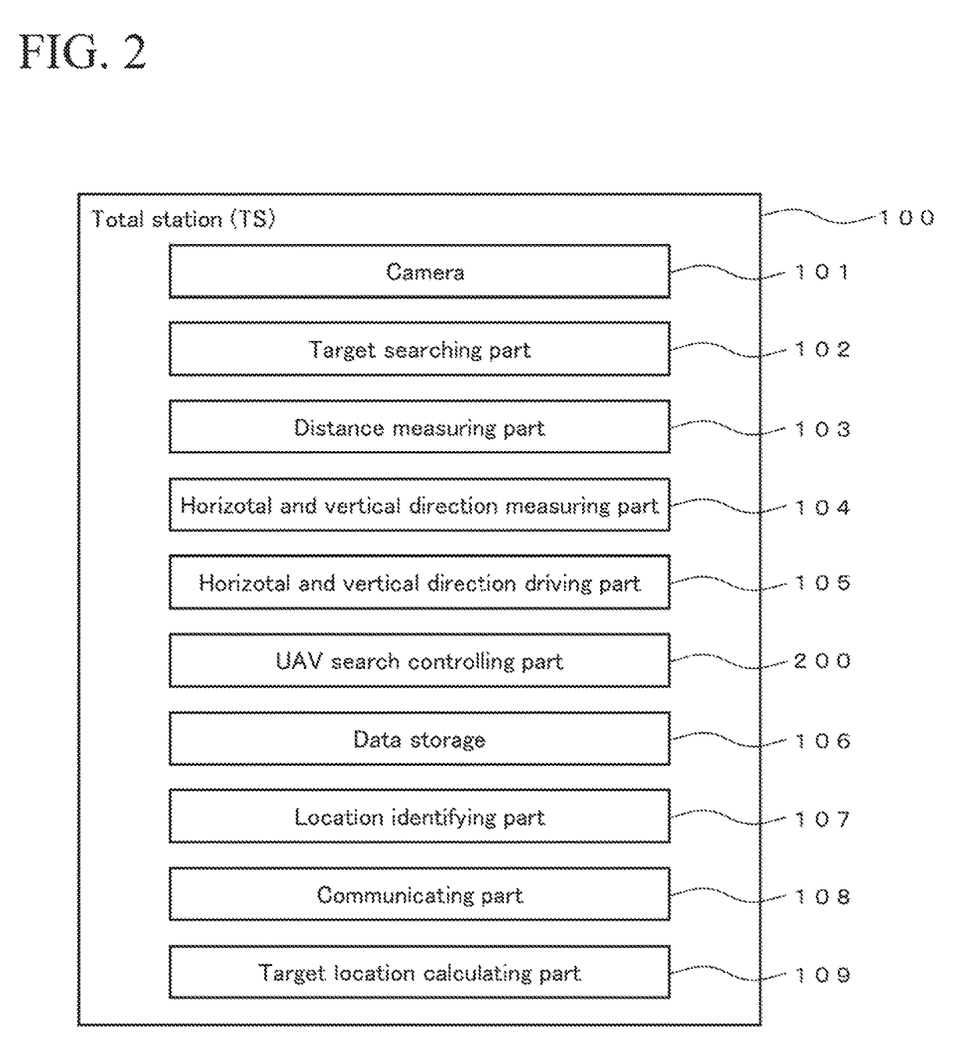
FIG. 2 is a block diagram of a total station.

Hereinafter, an example of a TS used in an embodiment of the present invention will be described. FIG. 2 shows a block diagram of a TS 100. The TS 100 has a configuration that is the same as or similar to that of a commercially available TS except for a UAV search controlling part 200. The TS 100 includes a camera 101, a target searching part 102, a distance measuring part 103, a horizontal and vertical direction measuring part 104, a horizontal and vertical direction driving part 105, a UAV search controlling part 200, a data storage 106, a location identifying part 107, a communicating part 108, and a target location calculating part 109.

The camera 101 photographs moving images or still images of an object to be surveyed, such as a target. The data of the images photographed by the camera 101 is stored in an appropriate storage area in association with measurement times, measurement directions, measurement distances, locations, and other parameters, of the object, for which distance is to be measured. In this embodiment, the camera 101 obtains images of the UAV. The target searching part 102 searches for the target by using searching laser light that is composed of fan-shaped beams. The distance measuring part 103 measures a distance to the target by using distance measuring laser light. The horizontal and vertical direction measuring part 104 measures a horizontal angle and a vertical angle (elevation angle or depression angle) of the target of which the distance is measured by the distance measuring part 103. An optical system for the target searching part 102 and the distance measuring part 103 is provided to a casing part of which horizontal rotation and elevation or depression angle are controllable. The horizontal angle and the vertical angle are measured by an encoder. The output of the encoder is received by the horizontal and vertical direction measuring part 104, and the horizontal angle and the vertical angle (elevation angle or depression angle) are measured.

The horizontal and vertical direction driving part 105 includes a motor, a driving circuit for the motor, and a controlling circuit for the driving circuit. The motor controls the horizontal rotation, the elevation angle, and the depression angle of the casing part, which has the optical system for the target searching part 102 and the distance measuring part 103. The UAV search controlling part 200 searches for the UAV in flight. The UAV search controlling part 200 will be described later. The data storage 106 stores control programs necessary for operating the TS 100, various kinds of data, survey results, and other information.

The location identifying part 107 locates the TS 100 by using the GNSS. The location identifying part 107 measures the location at high accuracy by using an error correction signal and data of an auxiliary navigation satellite. The communicating part 108 communicates with external devices. The TS 100 can be controlled by an external terminal (a dedicated terminal, a smartphone, or other device) and can communicate with the external terminal. The communication type may include a wireless communication and an optical communication. The target location calculating part 109 calculates the location (coordinates) of the target (here, the UAV) relative to the TS 100, from the distance and the direction to the target. The distance to the target is obtained by the distance measuring part 103, and the direction of the target is obtained by the horizontal and vertical direction measuring part 104. Since the TS 100 is located by the location identifying part 107, the location of the target in the map coordinate system is determined by calculating the location of the target relative to the TS 100.

Configuration of UAV Search Controlling Part

Figure 3:
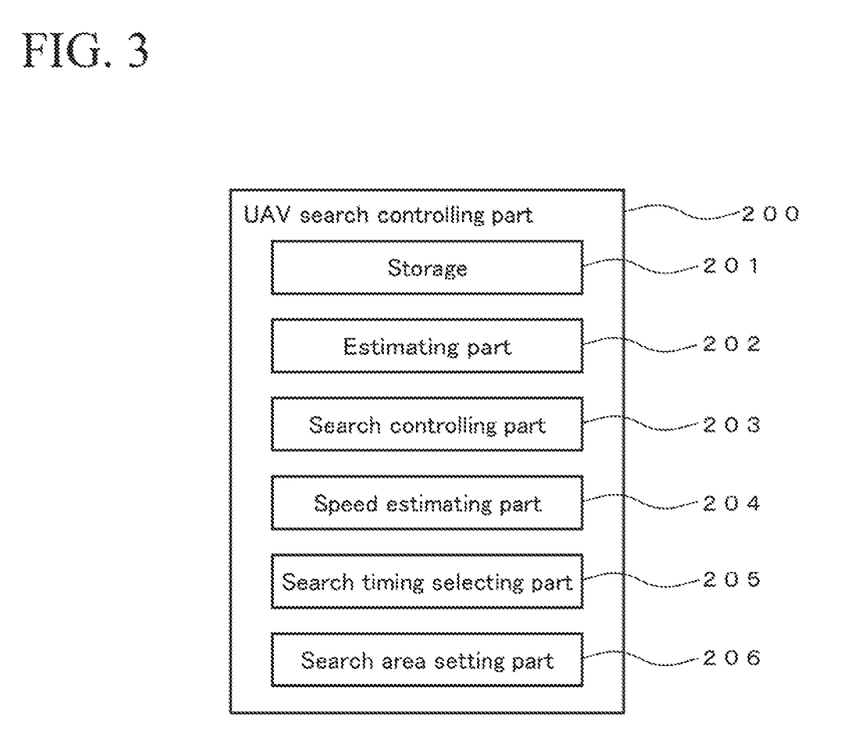
FIG. 3 is a block diagram of a UAV search controlling part.

Hereinafter, the UAV search controlling part 200 will be described. FIG. 3 is a block diagram of the UAV search controlling part 200. The UAV search controlling part 200 is a computer having a CPU, a storage, and various types of interfaces and is constructed of dedicated hardware.

A part or all of functional parts shown in FIG. 3 may be respectively constructed of dedicated arithmetic circuits. A functional part constructed of software and a functional part constructed of a dedicated arithmetic circuit may be used together.

For example, each of the functional parts shown in the drawing may be constructed of an electronic circuit such as a central processing unit (CPU), an application specific integrated circuit (ASIC), or a programmable logic device (PLD) such as a field programmable gate array (FPGA). Additionally, some functions may be implemented by dedicated hardware, and the rest may be implemented by a general-purpose microcomputer.

Whether each of the functional parts is to be constructed of dedicated hardware or is to be constructed of software so that programs are executed by a CPU is selected in consideration of necessary operating speed, cost, amount of electricity consumed, and other factors. Constructing the functional part by dedicated hardware and constructing the functional part by software are equivalent to each other from the viewpoint of obtaining a specific function.

The UAV search controlling part 200 includes functional parts that are implemented as a storage 201, an estimating part 202, a search controlling part 203, a speed estimating part 204, a search timing selecting part 205, and a search area setting part 206. The storage 201 stores the same data of a predetermined flight path as stored in the UAV. The data is flight plan data containing coordinates (latitude, longitude, and altitude) of specified multiple points Pn to be passed through and specified speeds between adjacent points. The UAV autonomously flies according to the flight plan. The location of the UAV at a specified time is calculated from the location of the point Pn and the flight time.

The storage 201 also stores location data of the TS 100 (refer to FIG. 2) that has the UAV search controlling part 200. The location of the TS 100 is preliminarily measured by the location identifying part 107 using a highly accurate GNSS or the coordinates of the TS 100 are measured by surveying using a reference point. The flight plan data can also be downloaded from another storage or a storage medium to the UAV search controlling part 200 and can be temporarily stored in the storage 201.

The estimating part 202 estimates the direction of the UAV as seen from the TS 100 at a specific time on the basis of the location data of the TS 100 stored in the storage 201 and the data of the predetermined flight path (flight plan data). Hereinafter, a principle for estimating the direction of the UAV as seen from the TS 100 will be described with reference to FIGS. 4A and 4B. Note that the following explanation describes a basic principle, and other various methods are also possible.

Figure 4A:
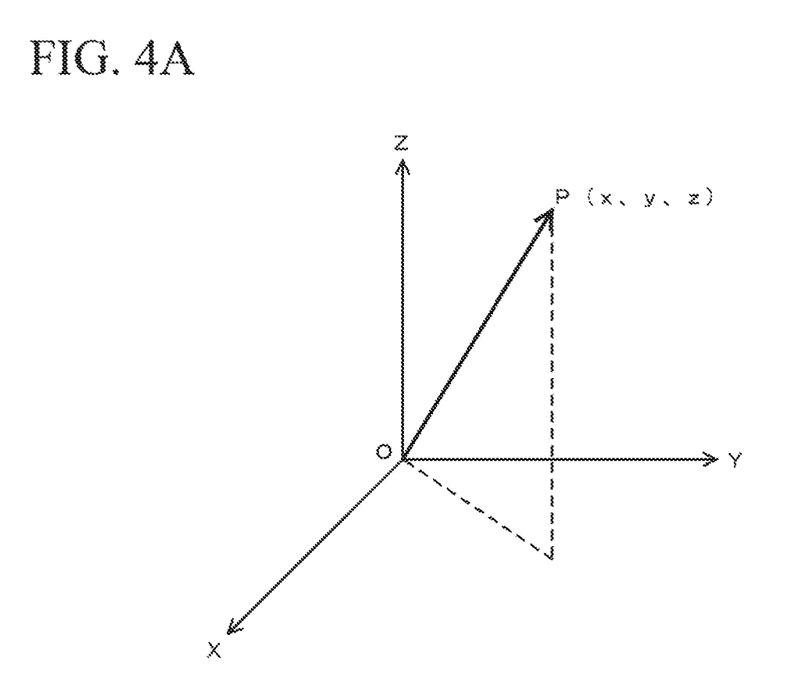
FIGS. 4A and 4B are principle diagrams showing a principle for calculating an apparent speed of a UAV as seen from a TS.
Figure 4B:
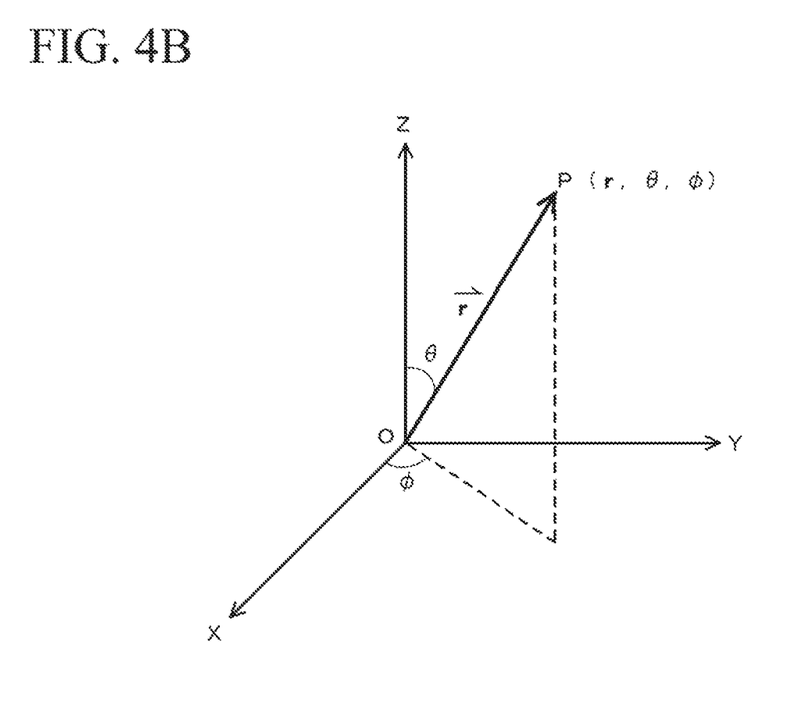

FIG. 4A shows a case of using a three-dimensional orthogonal coordinate system, and FIG. 4B shows a case of using a polar coordinate system. FIGS. 4A and 4B differ from each other only in the coordinate system, and they have the same relationship between the origin O and a point P.

In FIGS. 4A and 4B, the origin O represents the location of the TS 100 (measurement origin), and the point P represents the location of the UAV at a specific time. The location of the UAV is determined from the data of the predetermined flight path. Thus, the location of the UAV used here is based on a schedule (flight plan), and from this point of view, the following explanation describes processing relating to location estimation.

Hereinafter, an example of estimating the direction of the UAV as seen from the TS 100 at time t1 will be described. First, location data of a point P (location of the UAV) at the time t1 is obtained from the flight plan data. At this stage, as shown in FIG. 4A, the coordinates of the point P are specified by latitude, longitude, and altitude.

Then, the three-dimensional orthogonal coordinate system as shown in FIG. 4A is converted into the polar coordinate system as shown in FIG. 4B. This conversion is performed by rudimentary mathematical operation. The conversion into the polar coordinate system as shown in FIG. 4B provides a horizontal angle $\varphi$ (in this case, the angle starts from the X axis in a counterclockwise direction) and an elevation angle $\theta$. The angles ($\varphi$, $\theta$) represent an estimated direction of the UAV as seen from the TS at the time t1. Moreover, the directions of the UAV at time t2, t3, . . . are calculated according to the same principle as described above. Thus, the directions of the UAV as seen from the TS 100 at specified times are estimated. Furthermore, a vector "r" (refer to FIG. 4B) at each time is also obtained. The vector "r" represents the direction and the distance of the UAV as seen from the TS 100. The processing for calculating the coordinates (r, $\varphi$, $\theta$) according to the above-described principle is performed by the estimating part 202.

The search controlling part 203 controls search for the UAV on the basis of the direction estimated by the estimating part 202. The TS 100 has a movable part that uses a motor to turn in a horizontal direction, an elevation angle direction, and a depression angle direction. This operation of the motor is controlled by a control signal output from the search controlling unit 203.

As basic conditions, tracking of the UAV in flight is performed by an automatic target-tracking function of the TS 100. This function performs scanning of scanning laser light and detecting of light reflected from a target (here, the dedicated reflective prism) to make the TS 100 automatically track the UAV in flight. In the case of not performing the tracking from the start of the flight, and in the case in which the TS 100 fails to automatically track the UAV and loses sight of the UAV, the TS 100 should capture the UAV in flight. The processing for this capturing is performed by the search controlling part 203. The search for the UAV can be performed at any timing, but in particular, the timings mentioned below are preferable.

The speed estimating part 204 estimates an apparent speed of the UAV as seen from the TS 100. The apparent speed of the UAV as seen from the TS 100 is defined as a rate of change in line of sight of the TS 100 tracking the UAV. For example, in the case shown in FIG. 4B, the rate of change in line of sight of the TS 100 tracking the UAV is represented by a change rate of φ to time (dφ/dt) and a change rate of θ to time (dθ/dt). That is, a result of an angle change rate (dφ/dt), which represents a change in the angle φ direction to time, and an angle change rate (dθ/dt), which represents a change in the angle θ direction to time, is specified as the apparent speed of the UAV as seen from the TS 100. The change rate of the angles (φ, θ), that is, the angle change rates (dφ/dt) and (dθ/dt) are calculated by the speed estimating part 204.

The search timing selecting part 205 selects one from among search timings described below. In selecting the search timing, a timing that comes first in a time scale may be selected, or a timing may be selected on the basis of the time and the order of predetermined priority or on the basis of other rule. Additionally, two or more of the timings may be selected, and the processing may be sequentially executed at the selected multiple timings. The search is started at ΔT seconds after the UAV is lost (after the sight of the UAV is lost), ΔT' seconds after the UAV starts to fly, or specified hours, minutes, and seconds indicated by a clock that is mounted on the TS 100 or the UAV search controlling part 200.

Hereinafter, preferable search timings will be described. The preferable search timings described below are estimated based on the flight plan data.

First Preferable Search Timing

A first preferable search timing comes when the apparent speed, which is estimated by the speed estimating part 204, becomes a predetermined value or less. As the apparent speed of the UAV as seen from the TS 100 is increased, the UAV passes (crosses) through the irradiation range of the scanning laser light at a higher speed accordingly, which causes decrease in the probability of capturing the UAV with the scanning laser light.

Conversely, as the apparent speed of the UAV as seen from the TS 100 is decreased, the UAV passes (crosses) through the irradiation range of the scanning laser light at a lower speed accordingly, which causes increase in the probability of capturing the UAV with the scanning laser light. Thus, in the case in which the apparent speed of the UAV is estimated as being a predetermined threshold value or less, search for the UAV only within an airspace where the UAV is scheduled to fly according to the flight plan, increases the probability of capturing the UAV.

For example, the TS 100 may lose sight of the UAV at a specific time. In this case, an airspace where the apparent speed of the UAV is a predetermined value or less is estimated from the flight plan, and the TS 100 is oriented to this airspace to be prepared for the UAV that is predicted to come flying into this airspace. This increases the probability of recapturing the lost UAV. This method of capturing the UAV by waiting for the UAV to come flying into the airspace that is estimated from the flight plan is effective at other preferable search timings.

Second Preferable Search Timing

A second preferable search timing is an estimated timing when the UAV makes a circular flight. The speed of the UAV is reduced during circular flight. Moreover, an apparent traveling amount per unit time as seen from the TS 100 is small compared with a case of performing a straight flight. Thus, search for the UAV at the timing when the UAV turns increases the probability of capturing the UAV.

Third Preferable Search Timing

A third preferable search timing is an estimated timing when the UAV flies in a direction away from the TS 100. When the UAV flies in a direction away from the TS 100 as seen from the TS 100, the apparent traveling amount per unit time as seen from the TS 100 gradually decreases. Thus, search for the UAV at the timing when the UAV flies in a direction away from the TS 100 increases the probability of capturing the UAV.

Fourth Preferable Search Timing

The fourth preferable search timing is an estimated timing when the UAV flies beyond a predetermined distance from the TS 100. In the same visual field, the movement of the figure of the UAV passing through the visual field is slower when the UAV flies far from the TS 100 than when the UAV flies near the TS 100. Thus, in the case in which the UAV is predicted to fly beyond the predetermined distance by referring to a future path that is estimated from currently observed values, preparing in the proximity to the predicted flight path and search for the UAV enhance the probability of finding the UAV.

The search area setting part 206 sets a search area of the UAV on the basis of the search timing selected by the search timing selecting part 205. The search area is set as described below. First, in response to the selection of the search timing, a scheduled flight path at the selected search timing is obtained from the flight plan. On the basis of the obtained scheduled flight path, an area in a direction of the angles (φ, θ) as seen from the TS 100, where the UAV is scheduled to fly along the flight path, is obtained. An area including this area and some extra area is specified as the search area. This processing is performed by the search area setting part 206.

Example of Processing

Figure 5:
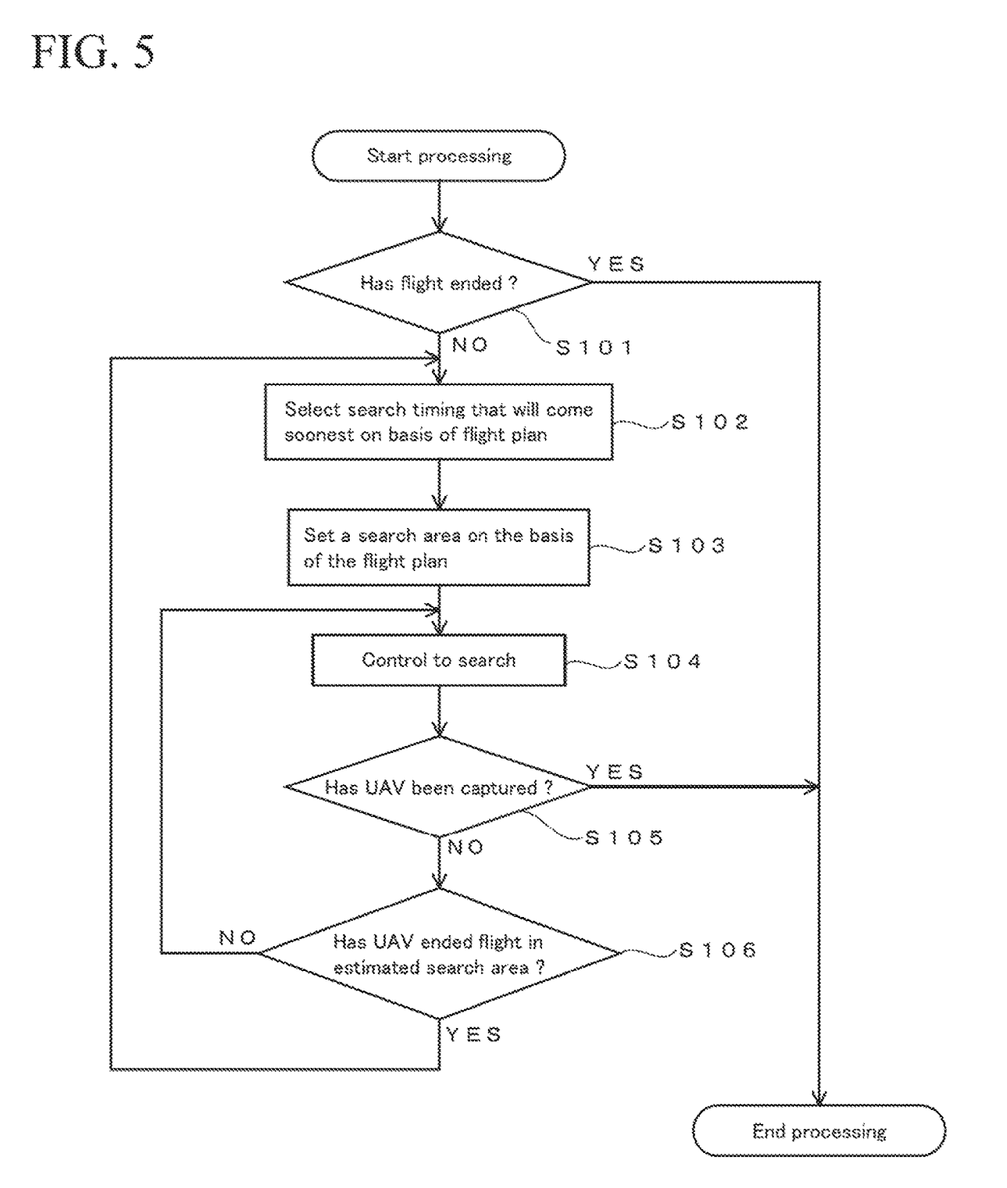
FIG. 5 is a flow chart showing an example of a processing procedure.

An example of processing that is executed by the UAV search controlling part 200 shown in FIG. 3 will be described. FIG. 5 shows an example of a processing procedure executed by the UAV search controlling part 200. Programs for executing the processing shown in FIG. 5 are stored in the storage 201 of the UAV search controlling part 200, in an appropriate storage medium, in a server in a network, or by other means, and are provided therefrom.

The processing shown in FIG. 5 is started in a condition in which the TS 100 does not capture the UAV. This condition occurs when the UAV starts to fly before the TS 100 captures the UAV and when the TS 100 loses the UAV during performing capture tracking.

After the processing starts, whether the UAV flies at the current time is judged (step S101). This judgment is based on the flight plan (data of the predetermined flight path associated with the flight time). When it is judged that the flight is not completed, the processing advances to step S102, and otherwise, the processing is terminated.

In step S102, by referring to the flight plan, a search timing that will come soonest from the current time is selected. Here, candidates of the search timings are the first to the fourth preferable search timings described above. Multiple search timings may be extracted at the same time. In this case, the search timing when the apparent speed is the lowest is selected.

In this processing, a specific time within the selected search timing is selected. The specific time is set at ΔT seconds after the UAV is lost (after the sight of the UAV is lost), ΔT' seconds after the UAV starts to fly, or specified hours, minutes, and seconds indicated by a clock that is mounted on the TS 100 or the UAV search controlling part 200.

For example, the flight plan contains a speed at each position (path) in the flight path. Thus, for example, in response to an instruction to execute the search in an area in a specific direction in ΔT seconds after the UAV is lost, tracking and search for the UAV are executed while estimating the flight airspace.

The processing in step S102 is performed by the search timing selecting part 205 shown in FIG. 3. The apparent speed is obtained from a vector "r" estimated by the estimating part 202 and from a change rate of the angles (φ, θ) estimated by the speed estimating part 204.

After the search timing is selected, a search area is set on the basis of the flight plan (step S103). In this processing, a specific period including the search timing selected in step S102 is selected, and a vector "r" in the specific period is calculated from the flight plan. An area including a scheduled flight path estimated from the vector "r" and including some extra area is set as an angle range of φ and θ. The search area is thus set. The processing in step S103 is performed by the search area setting part 206.

After the search area is set, search for the UAV in the set search area is started in a few moments (for example, 2 to 5 seconds) before an estimated time when the UAV reaches the search area (step S104). This processing is performed on the basis of the control signal from the search controlling part 203 by using a target searching function of the TS 100. The search for the UAV may be performed on the basis of results of analysis of images that may be photographed by the TS 100.

In this search, an apparent speed "V" of the UAV in the set search area is calculated by the speed estimating part 204, and the search is performed at an apparent scan speed "v", which is 2V, along an estimated traveling direction of the UAV. That is, the movement of the TS 100 is controlled so that the movable part of the TS 100 will move at an apparent speed of double the estimated apparent speed of the UAV (that is, the line of sight for search will move at a speed of double the estimated apparent speed of the UAV).

This control makes the TS 100 search for the UAV at a double speed in terms of apparent speed, thereby avoiding a problem of the scanning laser light emitted to scan the UAV not being able to reach the UAV and the search for the UAV failing. Multiple search scanning directions set along the traveling direction of the UAV enhance the probability of capturing the UAV.

A doubling of the apparent speed of the UAV is appropriate for the scan speed, but the scan speed is not limited thereto. In the case in which the apparent speed of the UAV as seen from the TS 100 changes drastically, an estimation of the apparent speed at each point in time (for example, at each 3 seconds) is calculated, and the TS 100 is controlled on the basis of the estimations.

When the search results in the UAV being captured in step S105, the processing is terminated, and otherwise, the processing advances to step S106. Whether the UAV is predicted to pass out of the search area set in step S103 is judged (step S106) because the UAV, which has not been captured, is predicted to still be in flight. When the UAV is judged as passing out of the set search area, the processing returns to the stage before step S102 to select the search area again. When the UAV is judged as not passing out of the set search area, the processing returns to step S104 to continue the search control.

Thus, the TS 100 preliminarily obtains the flight plan of the UAV and searches for the UAV that is still not captured by the TS 100, on the basis of the flight plan.

In accordance with a further embodiment, the UAV search controlling part 200 as shown in FIG. 3 may be configured as a separate control device. In this case, the UAV search controlling part 200 described in relation to FIG. 3 is a separate device. This control unit is connected to a TS via an appropriate communication channel such as a wireless communication network, and the control unit outputs a control signal to the TS to control the operation of the TS. This TS is configured so that its operation is controllable from outside.

The control device equipped with the UAV search controlling part 200 may be constructed of dedicated hardware, or the control device may have functions as shown in FIG. 3, which are performed by operation software installed in a PC, a tablet, a smartphone, or other electronic device. In a case of using a tablet, arithmetic operation that is difficult to be performed by the tablet may be performed by an external device. The external device may be used in conjunction with the tablet to configure the UAV search controlling part 200 as a system. Such a configuration is not limited to the case of using the tablet, and the same configuration can also be applied to the case of using a PC, a smartphone, or other electronic device. The UAV search controlling part 200 may also be implemented by a remote server. The server may be accessed via an internet channel or another channel from a tablet or a smartphone, and the tablet or the smartphone may be used as a terminal to perform the operation.

The functional parts as shown in FIG. 3 may also be configured as a system that is implemented by multiple separate hardware connected to each other via a communication channel. For example, a smartphone is used as a control terminal, a server or a PC is used as the storage 201, and an auxiliary unit is used to contain hardware for implementing the other functional parts, in its housing that has an adapter for connection to the TS. The auxiliary unit is communicable with the smartphone and the server via an internal channel or another channel. To perform the operation described in the First Embodiment, a flight plan data is downloaded from the server to the auxiliary unit, and the smartphone is used as a control terminal. In this case, the distributed functional parts integrally function as a system via a communication channel. This system executes the processing shown in FIG. 5.

What is claimed is:

1. An operating device configured to be used in a search for an unmanned aerial vehicle that flies along a predetermined flight path, the operating device comprising:
   an estimating part that estimates, on the basis of location data of a surveying device that surveys a location of the unmanned aerial vehicle by using laser light and on the basis of the predetermined flight path, a direction of the unmanned aerial vehicle as seen from the surveying device at a specific time;
   a search controlling part that controls to allow the surveying device to search for the unmanned aerial vehicle, on the basis of the estimated direction; and
   an apparent speed estimating part that estimates an apparent speed of the unmanned aerial vehicle as seen from the surveying device on the basis of the predetermined flight path, wherein the surveying device is configured to search for the unmanned aerial vehicle by using searching laser light, and the search controlling part controls to allow a movable part of the surveying device to move at a double speed in terms of the apparent speed of the unmanned aerial vehicle, which is estimated by the apparent speed estimating part, in the search for the unmanned aerial vehicle performed by the surveying device.

2. The operating device according to claim 1, wherein multiple search scanning directions are set along a traveling direction of the unmanned aerial vehicle.

3. An operating method used in a search for an unmanned aerial vehicle that flies along a predetermined flight path, the operating method comprising:

estimating, on the basis of location data of a surveying device that surveys the unmanned aerial vehicle by using laser light and on the basis of the predetermined flight path, a direction of the unmanned aerial vehicle as seen from the surveying device at a specific time, controlling to allow the surveying device to search for the unmanned aerial vehicle, on the basis of the estimated direction; and estimating an apparent speed of the unmanned aerial vehicle as seen from the surveying device on the basis of the predetermined flight path, wherein the surveying device is configured to search for the unmanned aerial vehicle by using searching laser light, and the controlling includes controlling to allow a movable part of the surveying device to move at a double speed in terms of the estimated apparent speed of the unmanned aerial vehicle, in the search for the unmanned aerial vehicle performed by the surveying device.

4. The operating method according to claim 3, wherein multiple search scanning directions are set along a traveling direction of the unmanned aerial vehicle.

5. An operating system configured to be used in a search for an unmanned aerial vehicle that flies along a predetermined flight path, the operating system comprising:

an estimating part that estimates, on the basis of location data of a surveying device that surveys the unmanned aerial vehicle by using laser light and on the basis of the predetermined flight path, a direction of the unmanned aerial vehicle as seen from the surveying device at a specific time;

a search controlling part that controls to allow the surveying device to search for the unmanned aerial vehicle, on the basis of the estimated direction, and an apparent speed estimating part that estimates an apparent speed of the unmanned aerial vehicle as seen from the surveying device on the basis of the predetermined flight path, wherein the surveying device is configured to search for the unmanned aerial vehicle by using searching laser light, and the search controlling part controls to allow a movable part of the surveying device to move at a double speed in terms of the apparent speed of the unmanned aerial vehicle, which is estimated by the apparent speed estimating part, in the search for the unmanned aerial vehicle performed by the surveying device.

6. The operating system according to claim 5, wherein multiple search scanning directions are set along a traveling direction of the unmanned aerial vehicle.

* * * * *